May 8, 1962 — L. F. URRY — 3,033,909
FIBER-BONDED ELECTRODES
Filed Nov. 3, 1959 — 2 Sheets-Sheet 1

INVENTOR.
LEWIS F. URRY
BY
ATTORNEY

May 8, 1962     L. F. URRY     3,033,909
FIBER-BONDED ELECTRODES
Filed Nov. 3, 1959     2 Sheets-Sheet 2

INVENTOR.
LEWIS F. URRY
BY
ATTORNEY

United States Patent Office 3,033,909
Patented May 8, 1962

3,033,909
FIBER-BONDED ELECTRODES
Lewis F. Urry, Parma, Ohio, assignor to Union Carbide
Corporation, a corporation of New York
Filed Nov. 3, 1959, Ser. No. 850,627
5 Claims. (Cl. 136—59)

This invention relates to fiber-bonded electrodes for use in heavy duty primary and secondary cells wherein said fibers are used in the form of a pile.

It has already been suggested to use fibers of a suitable thermoplastic material as the bonding agent for strong, flexible, high-capacity electrodes. In this practice the dry electrode mix containing a small amount (1 to 7 weight percent) of the fibers is pressed onto a suitable metallic current collector and simultaneously heated to the softening point of the plastic fibers. The fibers are thereby "self-welded" to each other, forming an interlocking network of fibers which serves to hold the mix particles together.

Certain modifications of the above-identified method are desirable for large scale commercial manufacture of the electrodes. A particular problem to be overcome is that of separation of the fibers from the dry electrode mix prior to fabrication of the electrodes. Since the plastic fibers are fluffy and much lighter in weight than the remainder of the material in the mix, settling of the heavier mix particles tends to occur, particularly in large batches. Thus, the proportion of bonding fibers to active particles in the mix may not remain constant in a series of electrodes made therefrom.

With the above in mind, the major object of the present invention is to provide novel fiber-bonded electrodes having a continuous supply of the required amount of fibers.

A related object of the invention is to provide electrodes having a strong network of interlocking bonding fibers steadfastly supporting and retaining the active particles therein, even when the electrode is subjected to excessive handling or shock.

Figure 1:
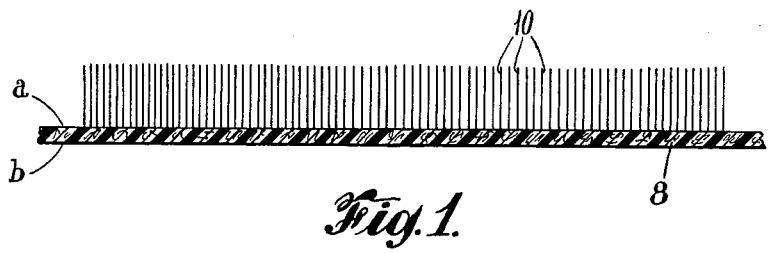
Figure 2:
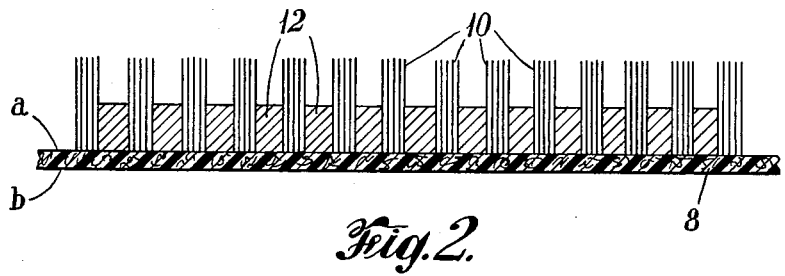
Figure 3:
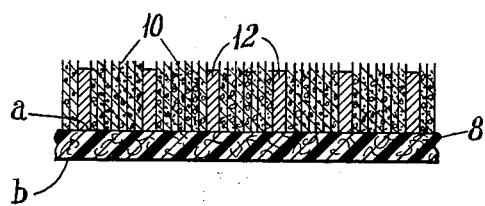
Figure 4:
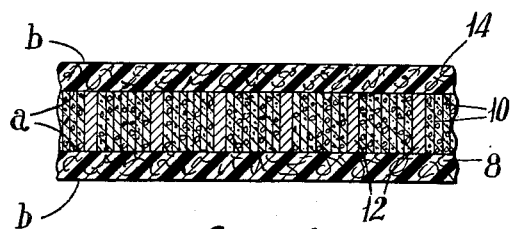
Figure 5:
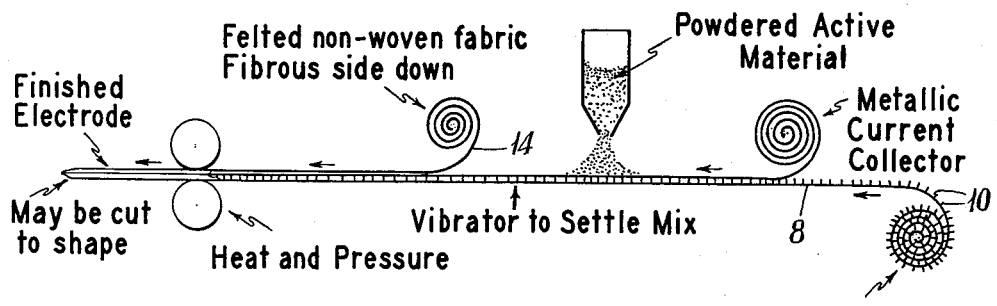
Figure 6:
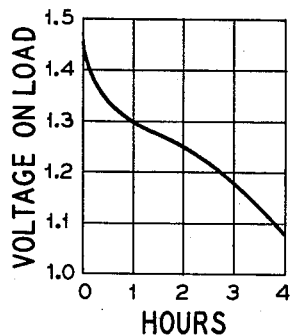
Figure 7:
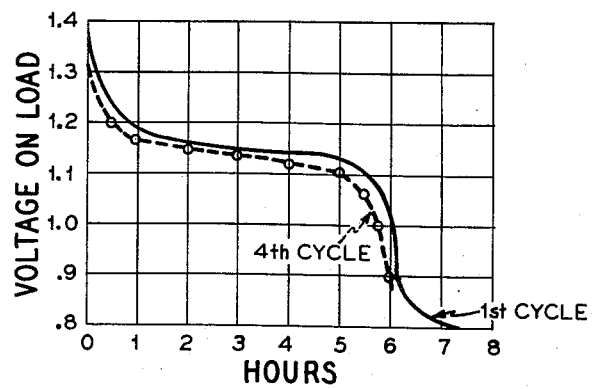

In the drawing:
FIG. 1 is a side elevational view of an electrode structure for the electrodes of the invention;
FIG. 2 is a side elevational view of the subject electrode showing the disposition of its collector grid screen;
FIGS. 3 and 4 are fragmentary cross-sectional views of the instant electrode at different stages of fabrication;
FIG. 5 is a schematic representation of a typical assembly line based on the method of the invention; and
FIGS. 6 and 7 are graphs showing respectively the performance of Leclanché and nickel-cadmium cell systems using the subject electrodes.

As shown on FIGS. 1 through 4 inclusive, the electrode of the invention comprises a sheet of woven or non-woven thermoplastic material which may consist of fibers of vinyl choloride-vinyl acetate attached to a backing sheet of a felted non-woven fabric made of vinyl chloride-vinyl acetate and regenerated cellulose.

In the felted backing sheet, the vinyl chloride-vinyl acetate material is concentrated on one side a of the sheet and the regenerated cellulose material is concentrated on the other side b. The protruding vinyl chloride-vinyl acetate fibers 10 are bonded to the vinyl chloride-vinyl acetate side of the sheet.

The fibers 10 should have sufficient body and stiffness to project through the openings in a suitable metal current collector 12 such as an expanded metal grid or a metal wire screen which is placed on top of the plastic pile fabric. Vibration may be needed to permit the current collector 12 to settle down over the upright fibers as illustrated in FIG. 2. An electrostatic charge may be employed to hold the fibers upright. The dry powdered mix of electrochemically active materials is then sifted onto the projecting fibers and settled in place between the fibers by some method such as vibration. The fibers then continue to project above the collector grid and powdered mix as shown in FIG. 3. The tops of the fibers are left clean and exposed in order to make a complete "weld" to the fibers in the sealing sheet. The final step then consists of placing a woven or non-woven felted sheet 14 containing thermoplastic fibers, such as Viskon-Vinyon, on top of the protruding fibers 10 and applying sufficient pressure (up to 5 tons per square inch) and heat to bond the fibers to side a of the sheet 14. [Viskon-Vinyon is a trade name for a felted non-woven fabric containing Vinyon (vinyl chloride-vinyl acetate) fibers and Viskon (regenerated cellulose) fibers.] The fibers thus bonded on both ends to sheets 8 and 14 form a strong network supporting and retaining the active particles even when the electrode is handled excessively. A minimum of space is needed for the fibers to achieve maximum bonding. This completed structure, which is illustrated in FIG. 4, may be compared to a stitched "sandwich" without the space loss and cover sheet perforations accompanying any mechanical stitching operation.

FIG. 5 illustrates a typical assembly line set up based on the subject method. Rolls of the selected thermoplastic pile fabric and the metallic current collector material may be automatically unrolled and assembled together. The powdered active material may then be fed from a hopper onto the moving fabric at a rate sufficient to provide the desired amount of active material per unit area. Finally, the top plastic sheet is brought into contact with and heat-sealed to the fibers in the pile fabric as previously described. The finished electrode may then be cut into the desired shape and assembled into a cell.

Electrodes for various acid and alkaline electrolyte systems may be constructed by the subject method. The main requirements for selecting the fibrous material are that the fibers and sheets be thermoplastic and stable in the cell environment. The pile backing may be constructed of various woven and non-woven materials other than the "Viskon-Vinyon" described earlier, provided that the material is adaptable to pile fabrication techniques, such as adhesion or stitching. Felted "Dynel" is suitable for use in acid or alkaline systems and woven nylon may be used in dilute alkaline environments.

As an example of the subject invention, the following formulation may be employed in the manner described above to construct $MnO_2$ cathodes which are suitable for use either in acid or alkaline cell environments:

*Formula 1*

| | Percent by weight |
|---|---|
| Manganese dioxide | 80 |
| Graphite powder | 20 |
| | 100 |

Nine grams of the above mixture were used to produce a finished electrode having the dimension 2.9 inches by 3.6 inches by 0.03 inch. The actual amount of plastic fibers in this electrode by the subject technique is only 0.4 gram.

Other cathode depolarizers, such as HgO, $Ni(OH)_2$, $Ag_2O$ and depolarizer mixtures such as $HgO-MnO_2$, may also be employed. Filamentary conductive materials, e.g., steel wool fibers, may be included if desired.

The following is an example of a nickel oxide cathode formulation which was used to construct an inexpensive and durable, high rate cathode for nickel-cadmium cells:

Formula 2

| | Percent by weight |
|---|---|
| Nickel hydroxide powder | 77.6 |
| Graphite | 22.4 |
| | 100.00 |

Six and one-half grams of this mixture are sufficient for a 2.9 inches by 3.6 inches by 0.03 inch electrode. If desired, steel wool fibers may be added to the mix or finely divided nickel powder may be substituted for both graphite and steel wool.

The corresponding cadmium anode was constructed using the following formulation:

Formula 3

| | Percent by weight |
|---|---|
| Powdered cadmium | 43.40 |
| CdO | 46.55 |
| Carboxymethylcellulose (CMC) | 1.45 |
| FeO | 8.60 |
| | 100.00 |

Twelve grams of the above were sufficient for a 2.9 inch by 3.6 inch by 0.03 inch electrode. The CMC may be omitted from the above formula, if desired, and finely powdered nickel may be substituted for the iron oxide.

Other metal anodes, e.g., zinc, may also be constructed according to the subject invention. A suitable zinc anode formulation for use in alkaline cells is the following:

Formula 4

| | Percent by weight |
|---|---|
| Zinc powder, 4% amalgamated | 43.76 |
| ZnO | 53.48 |
| CMC | 1.72 |
| HgO | 1.04 |
| | 100.00 |

With this technique of bonding electrodes, the ZnO, CMC and HgO may be omitted, so that only the powdered zinc is employed.

FIGS. 6 and 7, respectively, show the excellent discharge characteristics of a fiber-bonded $MnO_2$ cathode (Formula 1) in a Leclanché primary cell and of a rechargeable nickel-cadmium cell wherein both electrodes (Formulas 2 and 3) were bonded by means of the subject method.

The cell, the performance of which is illustrated on FIG. 6, consisted of two positive plates having the dimensions 10 sq. in. by 0.03, and contained 8.5 grams of mix per plate. The capacity of the plates which had a total of 17 grams of mix was found to be 3.35 ampere hours. The collector for the plates was a metal grid coated with a conductive carbon paint. The negative electrodes were made of sheet zinc. The cell was discharged under a 4 ohm continuous discharge with the indicated result.

In the case of FIG. 7, the cell consisted of two positive and three negative 10 in.$^2$ by 0.03 inch plates. Again, a 4 ohm continuous discharge was employed. The similarity between the first and fourth discharge cycles should be noted.

What is claimed is:

1. An electrode comprising a felted non-woven fabric encasing a metal collector having perforations therein, thermoplastic fibers protruding through said perforations, electrochemically active particles supported and retained by said fibers, the protruding ends of said fibers being heat-sealed to said fabric.

2. The electrode of claim 1 wherein said electrochemically active particles consist of nickel hydroxide and graphite.

3. The electrode of claim 1 wherein said electrochemically active particles consist of manganese dioxide and graphite.

4. The electrode of claim 1 wherein said electrochemically active particles comprise cadmium, cadmium oxide and iron oxide.

5. The electrode of claim 1 wherein said electrochemically active particles comprise zinc, zinc oxide and mercuric oxide.

References Cited in the file of this patent

UNITED STATES PATENTS

| 651,471 | Ribbe | June 12, 1900 |
| 682,899 | D'Arnoult | Sept. 17, 1901 |
| 2,247,091 | Juman | June 24, 1941 |
| 2,610,220 | Brennan | Sept. 9, 1952 |
| 2,616,938 | Brandt | Nov. 4, 1952 |

FOREIGN PATENTS

| 467,696 | Great Britain | June 22, 1937 |